(12) United States Patent
Wu et al.

(10) Patent No.: US 8,990,594 B2
(45) Date of Patent: Mar. 24, 2015

(54) APPARATUS FOR MEASURING A REMAINING POWER OF A BATTERY INCLUDES A FIRST MEMORY FOR STORING A ROUTINE CODE AND A SECOND MEMORY FOR STORING AN EXCEPTION CODE

(75) Inventors: Chia-Hsieh Wu, Changhua County (TW); Ying-Che Lo, Tainan (TW)

(73) Assignee: Energy Pass Incorporation, Hsinchu Science Park, Hsinchu (TW)

( * ) Notice: Subject to any disclaimer, the term of this patent is extended or adjusted under 35 U.S.C. 154(b) by 291 days.

(21) Appl. No.: 13/597,246

(22) Filed: Aug. 28, 2012

(65) Prior Publication Data

US 2014/0068143 A1 Mar. 6, 2014

(51) Int. Cl.
*G06F 1/00* (2006.01)
*G06F 9/24* (2006.01)
*G06F 12/02* (2006.01)

(52) U.S. Cl.
CPC .................................. *G06F 12/02* (2013.01)
USPC .................................. 713/300; 713/1; 713/2

(58) Field of Classification Search
CPC ....... G06F 3/0611; G06F 3/0613; G06F 1/26; G06F 1/3212

USPC .................................................. 713/1, 2, 300
See application file for complete search history.

(56) References Cited

U.S. PATENT DOCUMENTS

| 5,646,509 | A | * | 7/1997 | Berglund et al. .............. 713/321 |
| 5,691,742 | A | * | 11/1997 | O'Connor et al. ............. 715/835 |
| 5,999,476 | A | * | 12/1999 | Dutton et al. ............. 365/230.01 |
| 2007/0033336 | A1 | * | 2/2007 | Oh ................................. 711/104 |
| 2007/0189400 | A1 | * | 8/2007 | Nakano et al. ................ 375/242 |
| 2008/0197809 | A1 | * | 8/2008 | Ho et al. ........................ 320/134 |
| 2011/0029735 | A1 | * | 2/2011 | Chiang et al. ................. 711/125 |
| 2011/0113216 | A1 | * | 5/2011 | Toita et al. .................... 711/206 |
| 2011/0283051 | A1 | * | 11/2011 | Lieber et al. .................. 711/103 |

* cited by examiner

*Primary Examiner* — Vincent Tran
(74) *Attorney, Agent, or Firm* — Winston Hsu; Scott Margo

(57) ABSTRACT

An apparatus for measuring a remaining power of a battery unit includes a first memory unit, a second memory unit, and a processor. The first memory unit stores a first program code. The second memory unit stores a second program code. The second memory unit is accessed at a second speed that is lower than a first speed at which the first memory unit is accessed. The processor is utilized for reading the first program code from the first memory unit to execute calculation for current of the battery unit during a normal operation mode and reading the second program code from the second memory unit to execute an exception during the normal operation mode if required.

15 Claims, 3 Drawing Sheets

(Normal operation mode)　(Sleep mode)

APPARATUS FOR MEASURING A REMAINING POWER OF A BATTERY INCLUDES A FIRST MEMORY FOR STORING A ROUTINE CODE AND A SECOND MEMORY FOR STORING AN EXCEPTION CODE

BACKGROUND OF THE INVENTION

1. Field of the Invention

The present invention relates to a current measuring scheme, and more particularly, to an apparatus for measuring remaining power of a battery unit and a method thereof.

2. Description of the Prior Art

For a conventional current measuring scheme, a processor needs to access a flash memory unit to read out and execute a program code for performing current measuring upon a battery, so as to estimate the remaining power of the battery. For the processor, program codes that are executed to perform current measuring are all stored in the flash memory. It is necessary for the processor to readout the program codes from the flash memory to perform current measuring. Due to this, a longer processing time period is introduced for accessing the flash memory. Thus, performance of the whole system will be degraded.

SUMMARY OF THE INVENTION

Therefore, one of the objectives of the present invention is to provide an apparatus and corresponding method capable of measuring a remaining power of a battery unit by consuming a shorter processing time period to solve the above-mentioned problem.

According to an embodiment of the present invention, an apparatus for measuring a remaining power of a battery unit is disclosed. The apparatus comprises a first memory unit, a second memory unit, and a processor. The first memory unit is utilized for storing a first program code. The second memory unit is utilized for storing a second program code, wherein the second memory unit is accessed at a second speed that is lower than a first speed at which the first memory unit is accessed. The processor is electronically coupled to the first memory unit and the second memory unit, and utilized for reading the first program code from the first memory unit to execute calculation for a current of the battery unit during a normal operation mode and reading the second program code from the second memory unit to execute an exception during the normal operation mode if required.

According to the embodiment of the present invention, a method for measuring a remaining power of a battery unit is disclosed. The method comprises: providing a first memory unit utilized for storing a first program code; providing a second memory unit utilized for storing a second program code, the second memory unit being accessed at a second speed that is lower than a first speed at which the first memory unit is accessed; and reading the first program code from the first memory unit to execute calculation for a current of the battery unit during a normal operation mode and reading the second program code from the second memory unit to execute an exception during the normal operation mode if required.

To summarize, the embodiment of the present invention provides an accessing scheme for reading a regular program code from a higher speed memory unit and reading an optional program code from a lower speed memory unit if required. Thus, performance of the whole system can be improved effectively, and sizes of hardware circuits can be designed to be smaller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
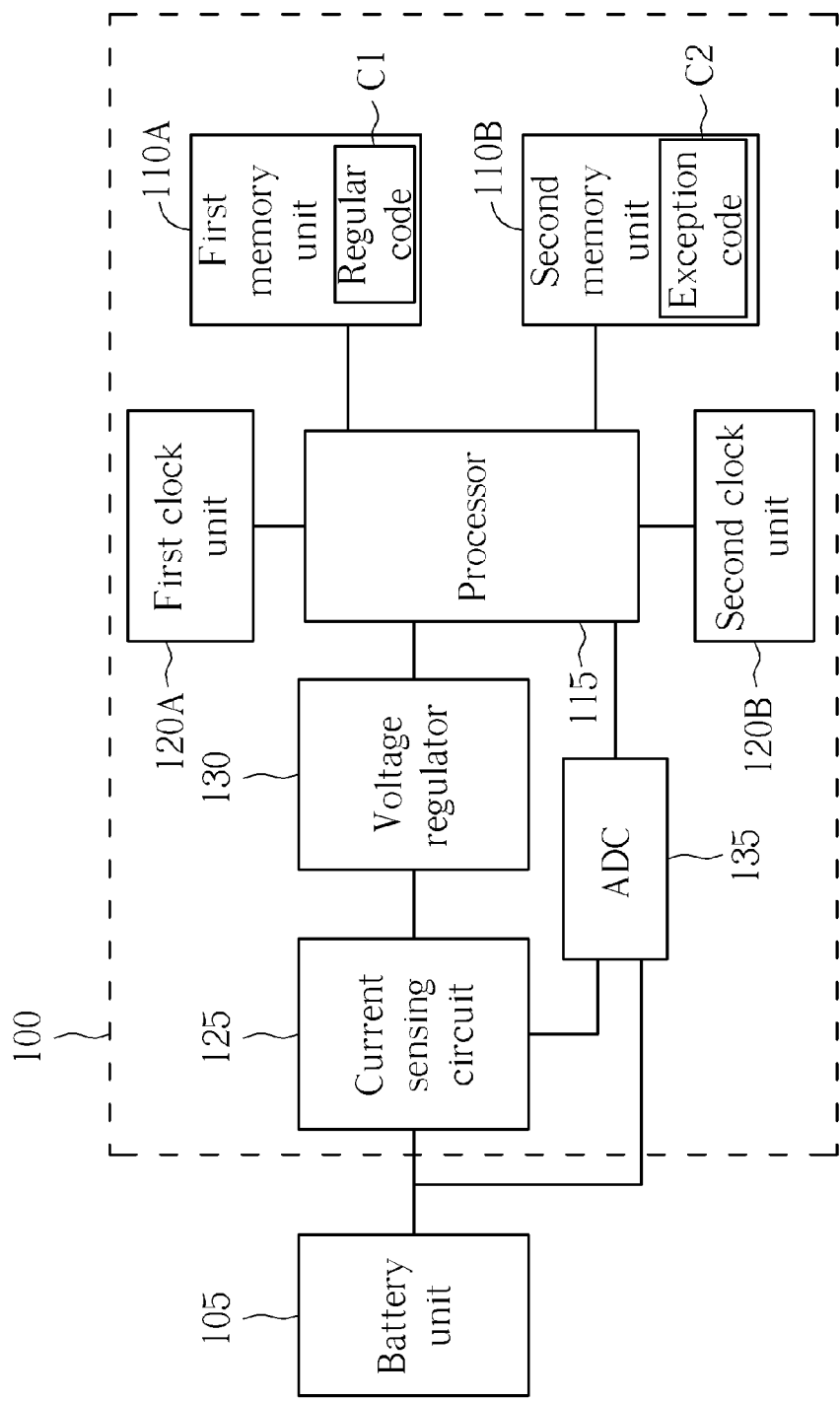
FIG. 1 is a block diagram of an apparatus for measuring a remaining power of a battery unit according to an embodiment of the present invention.

Please refer to FIG. 1, which is a block diagram of an apparatus 100 for measuring a remaining power of a battery unit 105 according to an embodiment of the present invention. The battery unit 105 may be a battery cell or a battery pack. The apparatus 100 comprises a first memory unit 110A, a second memory unit 110B, a processor 115, a first clock unit 120A, a second clock unit 120B, a current sensing circuit 125, a voltage regulator 130, and an analog-to-digital converter (ADC) 135. The apparatus 100 is utilized for measuring a remaining life/power of the battery unit 105. The first memory unit 110A is configured to be accessed by the processor 115 at a higher speed while the second memory unit 110B is configured to be accessed by the processor 115 at a lower speed. That is, the second memory unit 110B is accessed at a second speed that is lower than a first speed at which the first memory unit 110A is accessed. For instance, the first memory unit 110A is implemented by a static random access memory (SRAM), and the second memory unit 110B is implemented by a flash memory such as an Electrically-Erasable Programmable Read-Only Memory (EEPROM). This is not intended to be a limitation of the present invention, however. Other implementations of the first memory unit 110A and second memory unit 110B should also fall within the scope of the present invention. In this embodiment, the first memory unit 110A is implemented by the SRAM, and the second memory unit 110B is implemented by the flash memory.

In addition, the first clock unit 120A is a main clock of the apparatus 100 for providing a main clock signal source that is used for generating a clock signal having a frequency of several million hertz. The second clock unit 120B is used for generating a clock signal having a frequency of several hundred thousand hertz. The order of the clock signal provided by the first clock unit 120A is different from that provided by the second clock unit 120B.

The battery unit 105 provides/supplies a current to the current sensing circuit 125, and the current sensing circuit 125 is utilized for converting the current of battery unit 105 into a voltage that represents the battery current. The voltage is also provided to the ADC 135. The ADC 135 sends a digital signal indicating the batter current to the processor 115. The voltage regulator 130 is used for maintaining a voltage according to an output of the current sensing circuit 125. The voltage outputted by the voltage regulator 130 is transmitted to the processor 115.

The SRAM 110A is utilized for storing a first program code and the second memory unit 110B is utilized for storing a second program code wherein an operation performed by executing the first program code using the processor 115 is different from that performed by executing the second program code. The first program code is configured to be executed by the processor 115 for performing a calculation for the current of the battery unit 105 based on the digital signal of the ADC 135. The processor 115 executes the first program code to measure the remaining power of the battery unit 105. Additionally, the second program code is configured to be executed by the processor 115 to handle an exception if required. The exception, for example, may be an occurrence of an abnormal event. The abnormal event may indicate that the current or voltage of the battery unit 105 deviates from a normal range. For example, the abnormal event may occur when the current becomes too large or the voltage becomes too high. The abnormal event may occur when the current becomes too small or the voltage becomes too low.

The first program code used for current measuring is regarded as a regular normal operation code for the apparatus 100 since the apparatus 100 is used for measuring the remaining power of the battery unit 105. The processor 115 is arranged to execute the first program code for current measuring when the apparatus 100 is used for measuring the remaining power of the battery unit 105. The first program code can also be referred as to a regular code indicated by 'C1' as shown in FIG. 1. The second program code is regarded as an optional program code since the second program code is executed by the processor 105 to handle an exception if the exception occurs. The second program code can also be referred as to an exception code indicated by 'C2' as shown in FIG. 1. In the embodiments of the present invention, the program code used for current measuring is configured to be stored in the SRAM 110A before the processor 115 loads the program code into its register(s) while an optional program code is stored in the flash memory 110B. This is because the SRAM 110A can be accessed at a first speed that is significantly higher than a second speed at which the flash memory 110B is accessed. The processor 115 can execute the first program code (i.e. the regular normal program code) by reading the program code from the SRAM 110A with a higher speed rate. This effectively improves the performance of the whole system. Once an exception occurs, the processor 115 is arranged to switch from accessing the SRAM 110A to accessing the flash memory 110B to read out and execute the second program code for handling the exception. Since the optional program code is stored in the flash memory 110B rather than the SRAM 110A, this design can efficiently prevent the circuit size of the SRAM 110A from being too large.

It should be noted that the SRAM 110A is regarded as a program memory for the processor 115 when the processor 115 accesses the SRAM 110A to execute the first program code. Instead, the flash memory 110B is regarded as the program memory for the processor 115 when the processor 115 accesses the flash memory 110B to execute the second program code. In addition, the processor 115 is able to dynamically switch from accessing the SRAM 110A to accessing the flash memory 110B during one normal current measuring operation.

Figure 2:
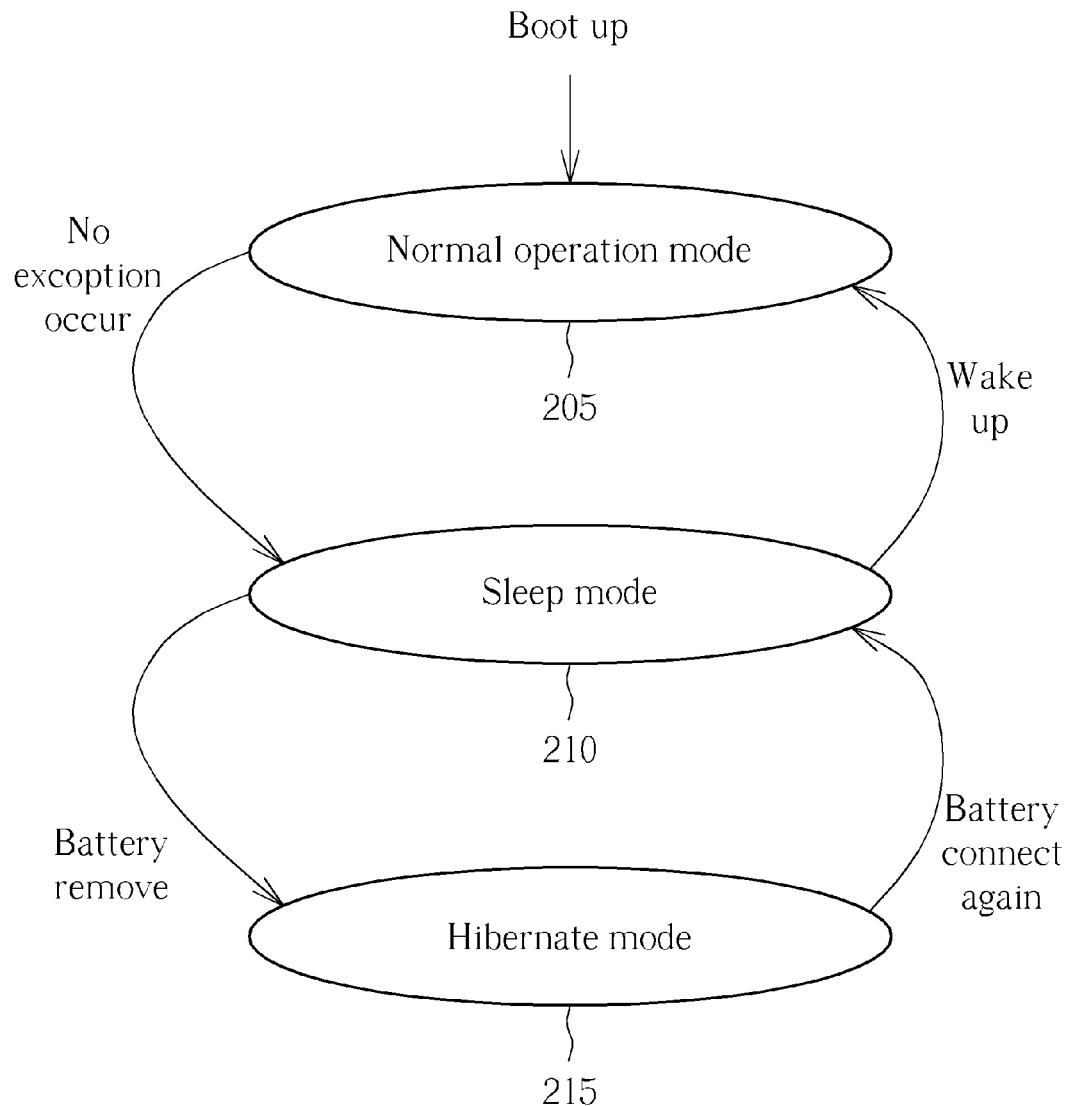
FIG. 2 is a simplified diagram illustrating the operation modes of the apparatus as shown in FIG. 1.

Please refer to FIG. 2, which is a simplified diagram illustrating the operation modes of the apparatus 100 as shown in FIG. 1. As shown in FIG. 2, the apparatus 100 may include three kinds of operation mode: the normal operation mode 205, a sleep mode 210, and a hibernate mode 215. Initially, when the apparatus 100 has not booted up, the first and second program codes may be stored in the flash memory 110B. Once the apparatus 100 boots up, the first program code is loaded into the SRAM 110A and stored in the SRAM 110A. When booting up, the apparatus 100 enters the normal operation mode 205 first. When entering the normal operation mode 205, the processor 115 reads the first program code from the SRAM 110A to execute the first program code for performing a calculation for the current of the battery unit 105. If no exception events occur, then the apparatus 100 exits the normal operation mode 205 and then enters the sleep mode 210 after completing the calculation for the current of the battery unit 105. If an exception event occurs during the calculation for the current of the battery unit 105, then the processor 115 is arranged to halt the execution of the first program code and then instead access the flash memory 110B. Under this condition, the processor 115 is arranged to read the second program code from the flash memory 110B and execute the second program code for handling the exception. It should be noted that the apparatus 100 is still in the normal operation mode 205 when the processor 115 accesses the flash memory 110B. After completing the execution of the second program code, the processor 115 is switched to access the SRAM 110A again, to continue the execution of the first program code. If another exception occurs, then the processor 115 is switched to access the flash memory 110B again for handling this exception. If no exceptions occur, then it is not required for the processor 115 to access the flash memory 110B, and under this condition, the apparatus 100 will then be switched from the normal operation mode 205 to the sleep mode 210 for power saving.

The apparatus 100 is configured to regularly or periodically measure the remaining power of the battery unit 105. When initially booting up, the apparatus 100 enters the normal operation mode 205. In the normal operation mode 205, the apparatus 100 is arranged to perform the above-mentioned operation, i.e. the calculation for the current of the battery unit 105 and/or the exception if required. When the calculation for the current has been completed and no exceptions occur, the apparatus 100 exits the normal operation mode 205 and then enters the sleep mode 210. In the sleep mode 210, power provided to the first clock unit 120A of the apparatus 100 is turned off. The first clock unit 120A is disabled. This can save more power since it is not required for the apparatus 100 to repeatedly perform current measuring for the battery unit 105. All that is required is for the apparatus 100 to regularly or periodically perform the current measuring. When the apparatus 100 is woken up to perform the current measuring, the apparatus 100 exits the sleep mode 210 and enters the normal operation mode 205 again. Additionally, in the normal operation mode, the apparatus 100 may perform detection upon the battery unit 105 to determine whether the battery unit 105 is removed or not. If the battery unit 105 has been removed, then the apparatus 100 enters the hibernate mode 215 so as to save more power. In the hibernate mode 215, power provided to all the circuitry elements except of the second clock unit 120B within the apparatus 100 are turned off. This is not meant to be a limitation of the present invention. If the battery unit 105 is connected to the apparatus 100 again, then the apparatus 100 exits the hibernate mode 215 and enters the normal operation mode 205 again. In practice, the apparatus 100 can detect the I2C bus to determine whether the battery unit 105 has been removed from the apparatus 100 or the battery unit 105 is still connected to the apparatus 100. When the status of the I2C bus is not at open-drain state, this indicates that the battery unit 105 has been removed from the apparatus 100. The apparatus 100 then enters the hibernate mode 215.

Figure 3A:
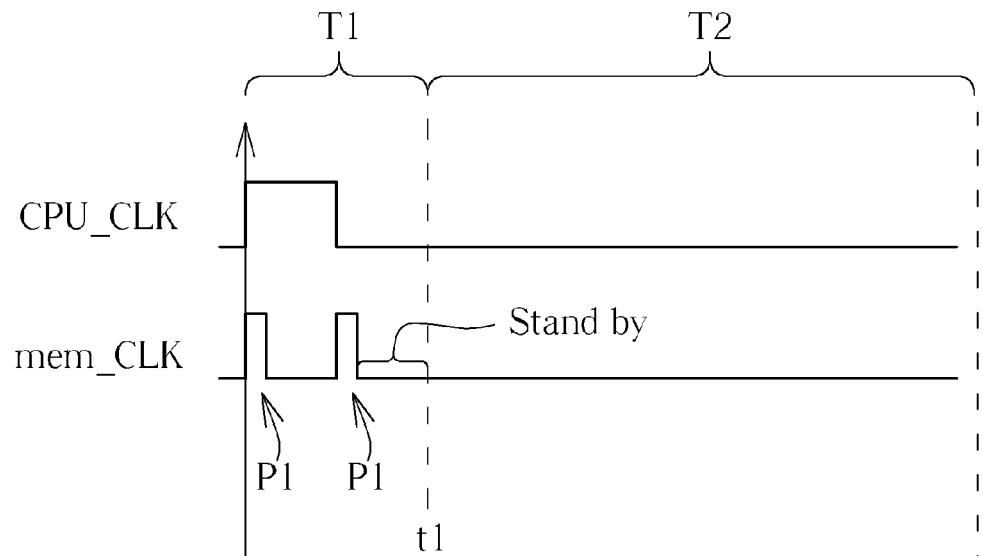
FIG. 3A is a diagram illustrating a waveform example of clock signals under a condition that the processor shown in FIG. 1 accesses the SRAM to execute a calculation for the current of the battery unit.
Figure 3B:
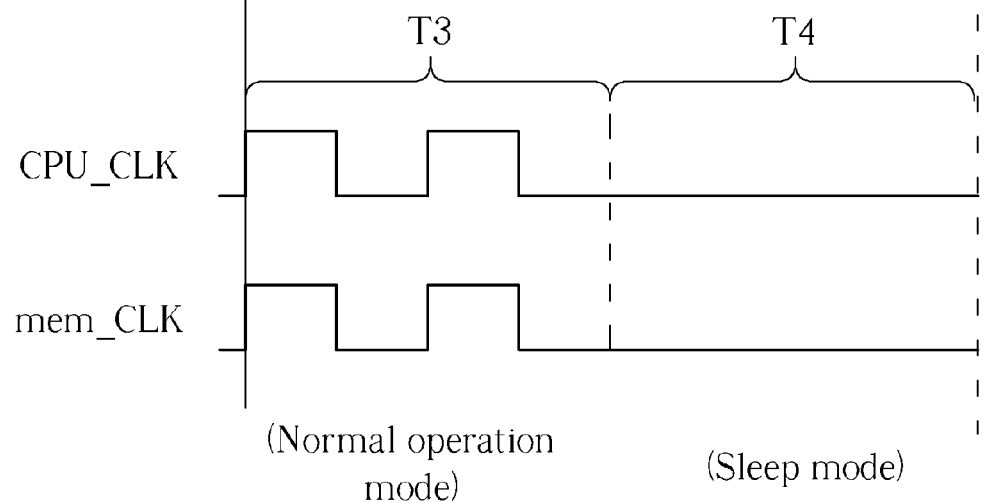
FIG. 3B is a diagram showing a waveform example of clock signals under a condition that a processor accesses a flash memory to execute a calculation for current of a battery unit.

Please refer to FIG. 3A in conjunction with FIG. 3B. FIG. 3A is a diagram illustrating a waveform example of clock signals under a condition that the processor 115 shown in FIG. 1 accesses the SRAM 110A to execute a calculation for the current of the battery unit 105. FIG. 3B is a diagram showing a waveform example of clock signals under a condition that a processor accesses a flash memory to execute a calculation for current of a battery unit. As shown in FIG. 3A, the apparatus 100 is in the normal operation mode during the time period T1, and is in the sleep mode during the time period T2. At timing t1, the apparatus 100 exits the normal operation mode and enters the sleep mode. Accordingly, the CPU clock signal indicated by 'CPU_CLK' is disabled at timing t1 since the processor 115 is disabled in the sleep mode during the time period T2. In the normal operation mode during the time period T1, the processor 115 accesses the SRAM 110A at pulses p1 of the program memory clock (indicated by 'mem_CLK') and then enters a stand-by state during each signal transition of 'CPU_CLK'. Since the SRAM 110A can be accessed by the processor 115 at a higher speed rate, time consumed by accessing the SRAM 110 can be significantly decreased. Relatively speaking, as shown in FIG. 3B, the accessing scheme causes a longer time period T3 for accessing a program memory since such the program memory is implemented by a flash memory.

To summarize, the embodiment of the present invention provides an accessing scheme for reading a regular program code from a higher speed memory unit and reading an optional program code from a lower speed memory unit if required. By this scheme, performance of the disclosed apparatus 100 in the embodiment of the present invention can be improved effectively. In addition, this scheme can also prevent the size of the disclosed apparatus 100 from becoming too large.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for measuring a remaining power of a battery unit, comprising:
    a first memory unit, for storing a first program code;
    a second memory unit, for storing a second program code, wherein the second memory unit is accessed at a second speed that is lower than a first speed at which the first memory unit is accessed;
    a processor, electronically coupled to the first memory unit and the second memory unit, for reading the first program code from the first memory unit to execute calculation for current of the battery unit during a normal operation mode, and for reading the second program code from the second memory unit to execute an exception during the normal operation mode if required;
    wherein the first program code is a routine code, and the second program code is an exception code; and, the processor switches from accessing the first memory unit to accessing the second memory unit to read out and execute the second program code during the normal operation mode if required, for handling the exception.

2. The apparatus of claim 1, wherein the first memory unit is an SRAM unit, and the second memory unit is a flash memory.

3. The apparatus of claim 1, wherein when the apparatus enters the normal operation mode, the processor is arranged to read the first program code from the first memory unit to execute the calculation for the current of the battery unit, and then read the second program code from the second memory unit to execute the exception if required.

4. The apparatus of claim 3, wherein the processor is arranged to access the first memory unit after accessing the second program code stored in the second memory unit.

5. The apparatus of claim 1, wherein the exception corresponds to an abnormal event and the processor is arranged to read the second program code from the second memory unit to execute the exception if the abnormal event occurs.

6. The apparatus of clam 5, wherein occurrence of the abnormal event indicates that a current/voltage of the battery unit deviates from a normal range.

7. The apparatus of claim 1, wherein the first program code is loaded into the first memory unit from the second memory unit when the apparatus boots up.

8. The apparatus of claim 1, wherein the first program code is a regular program code for routine tasks.

9. A method for measuring a remaining power of a battery unit, comprising:
    providing a first memory unit storing a first program code;
    providing a second memory unit storing a second program code, the second memory unit being accessed at a second speed that is lower than a first speed at which the first memory unit is accessed; and
    reading the first program code from the first memory unit to execute calculation for current of the battery unit during a normal operation mode, and reading the second program code from the second memory unit to execute an exception during the normal operation mode if required
    wherein the first program code is a routine code, and the second program code is an exception code; and, accessing the first memory unit is switched to accessing the second memory unit to read out and execute the second program code during the normal operation mode if required, for handling the exception.

10. The method of claim 9, further comprising:
    when entering the normal operation mode, reading the first program code from the first memory unit to execute the calculation for the current of the battery unit, and then read the second program code from the second memory unit to execute the exception if required.

11. The method of claim 9, further comprising:
    accessing the first memory unit again after accessing the second program code stored in the second memory unit.

12. The method of claim 9, wherein the exception corresponds to an abnormal event, and the method further comprises:
    reading the second program code from the second memory unit to execute the exception if the abnormal event occurs.

13. The method of clam 12, wherein occurrence of the abnormal event indicates that a current/voltage of the battery unit deviates from a normal range.

14. The method of claim 9, further comprising:
    loading the first program code into the first memory unit from the second memory unit when booting up.

15. The method of claim 9, wherein the first program code is a regular program code for routine tasks.

* * * * *